United States Patent
Zamani et al.

(10) Patent No.: US 9,236,973 B2
(45) Date of Patent: Jan. 12, 2016

(54) LINEAR DISPERSION POLARIZATION-TIME CODES AND EQUALIZATION IN POLARIZATION MULTIPLEXED COHERENT OPTICAL SYSTEM

(75) Inventors: Mahdi Zamani, Ottawa (CA); Chuandong Li, Ottawa (CA); Zhuhong Zhang, Ottawa (CA)

(73) Assignee: Futurewei Technologies, Inc., Plano, TX (US)

( * ) Notice: Subject to any disclaimer, the term of this patent is extended or adjusted under 35 U.S.C. 154(b) by 541 days.

(21) Appl. No.: 13/601,360

(22) Filed: Aug. 31, 2012

(65) Prior Publication Data
US 2013/0272704 A1    Oct. 17, 2013

Related U.S. Application Data

(60) Provisional application No. 61/623,296, filed on Apr. 12, 2012.

(51) Int. Cl.
| | |
|---|---|
| *H04B 10/04* | (2006.01) |
| *H04J 14/06* | (2006.01) |
| *H04B 10/532* | (2013.01) |
| *H04B 10/50* | (2013.01) |

(Continued)

(52) U.S. Cl.
CPC .............. *H04J 14/06* (2013.01); *H04B 10/532* (2013.01); *H04B 10/5055* (2013.01); *H04J 14/02* (2013.01); *H04L 27/2697* (2013.01)

(58) Field of Classification Search
CPC ...... H04J 14/06; H04J 14/02; H04L 27/2697; H04B 10/532; H04B 10/504; H04B 10/505; H04B 10/5055
USPC ............................................. 398/184, 152, 65
See application file for complete search history.

(56) References Cited

U.S. PATENT DOCUMENTS

2008/0279564 A1*   11/2008   Han et al. .................... 398/152
2010/0232804 A1*   9/2010    Djordjevic et al. ........... 398/152

FOREIGN PATENT DOCUMENTS

EP          1845647 A1     10/2007

OTHER PUBLICATIONS

S. Mumtaz et al. ("Space-Time codes for optical fiber communication with polarization multiplexing", IEEE International Conferance on ICC'2010, pp. 1-5).*

(Continued)

*Primary Examiner* — M. R. Sedighian
(74) *Attorney, Agent, or Firm* — Conley Rose, P.C.; Grant Rodolph; Adam J. Stegge

(57) ABSTRACT

A method of optical communication comprising encoding four modulated symbols to generate four encoded symbols in two orthogonal polarizations and transmitting the four encoded symbols in two successive time slots. An optical communication apparatus comprising a processor configured to receive two sequences of digital symbols in a plurality of time slots, wherein the two sequences correspond to two components of two orthogonal polarizations, wherein one digital symbol per polarization is received in each of the plurality of time slots, divide each of the two sequences into a plurality of groups using a modulo operation of time, wherein each group comprises two digital symbols received in two consecutive time slots, and adaptively equalize the four digital symbols of the two consecutive time slots using a 4×4 matrix to generate four modulated symbols, wherein the 4×4 matrix comprises 16 tap-vectors.

6 Claims, 16 Drawing Sheets

(51) Int. Cl.
    *H04J 14/02*  (2006.01)
    *H04L 27/26*  (2006.01)

(56) References Cited

OTHER PUBLICATIONS

Belfiore, et al., "The Golden Code: A 2×2 Full-Rate Space-Time code with Nonvanishing Determinants," IEEE Trans. Inform. Theory, vol. 51, No. 4, Apr. 2005, pp. 1432-1436.

Chen, Y., et al., "Space-Time Coding Schemes for Optical MIMO," European Conference and Exposition on Optical Communications, ECOC, Jul. 2011, 3 pages.

Djordjevic, I., et al., "Alamouti-Type Polarization-Time Coding in Coded-Modulation Schemes with Coherent Detection," Optics Express, vol. 16, No. 18, Sep. 2008, pp. 14163-14172.

Meron, E., et al., "Use of Space-Time Coding in Coherent Polarization-Multiplexed Systems Suffering From Polarization-Dependent Loss," Optical Letter, vol. 35, No. 21, Nov. 2010, pp. 3547-3549.

Mumtaz, S., et al., "PDL Mitigation in PolMux OFDM Systems using Golden and Silver Polarization-Time Codes," National Fiber Optic Engineers Conference, San Diego, California, Mar. 2010, 3 pages.

Mumtaz, S., et al., "Space-Time Codes for Optical Fiber Communication with Polarization Multiplexing," Communications, IEEE International Conference on, ICC'2010, Cape Town, South Africa, May 2010, pp. 1-5.

Tirkkonen, O., et al., "Improved MIMO Performance with Non-Orthogonal Space-Time Block Codes," Global Telecommunications Conference, IEEE, GLOBECOM'01, San Antonio, TX, USA, Nov. 2001, pp. 1122-1126.

\* cited by examiner

US 9,236,973 B2

LINEAR DISPERSION POLARIZATION-TIME CODES AND EQUALIZATION IN POLARIZATION MULTIPLEXED COHERENT OPTICAL SYSTEM

CROSS-REFERENCE TO RELATED APPLICATIONS

The present application claims priority to U.S. Provisional Patent Application No. 61/623,296 filed Apr. 12, 2012 by Mandi Zamani et al. and entitled "Linear Dispersion Polarization-Time Codes and Equalization in Polarization Multiplexed Coherent Optical System", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems are widely used for data communication. An optical coherent transportation link may transmit an optical signal, which may comprise two orthogonal polarization components (sometimes referred to as an X polarization and a Y polarization) with a same carrier frequency. The carrier frequency may refer to an optical wavelength supplied by a laser with phase noise. The propagation channel may comprise various components, such as one or more optical fibers (or fiber optics), amplifiers, and filters. Such components may be the sources of unwanted signal changes including, but not limited to, chromatic dispersion (CD), nonlinear phase noise, polarization mode dispersion (PMD), polarization dependent loss (PDL), polarization dependent gain, polarization rotation, and optical white Gaussian noise. For example, when propagating through the propagation channel, the optical signal may experience polarization state change, and its two polarization components may experience different losses due to PDL (e.g., PDL may make one polarization worse than the other). In this case, the overall performance of the optical system may be limited by the worst scenario. Thus, it is desirable to develop coding schemes that provide reliable optical communication despite the presence of unwanted signal changes.

SUMMARY

In one embodiment, the disclosure includes a method of optical communication comprising encoding four modulated symbols, denoted as $S_1$, $S_2$, $S_3$, and $S_4$, to generate four encoded symbols, denoted as $S_X^1$, $S_Y^1$, $S_X^2$, and $S_Y^2$, in two orthogonal polarizations, denoted as a X polarization and a Y polarization, using formulas $S_X^1=S_1+Z_3$, $S_X^2=-S_2-Z_4$, $S_Y^1=S_2-Z_4$, $S_Y^2=S_1-Z_3$, wherein $Z_3$ and $Z_4$ are computed as $$\begin{bmatrix} Z_3 \\ Z_4 \end{bmatrix} = M \begin{bmatrix} S_3 \\ S_4 \end{bmatrix},$$

where M is about $$\frac{1}{\sqrt{7}} \begin{bmatrix} 1+i & -1+2i \\ 1+2i & 1-i \end{bmatrix},$$

transmitting $S_X^1$ and $S_Y^1$ in a first time slot, and transmitting $S_X^2$ and $S_Y^2$ in a second time slot successive to the first time slot.

In another embodiment, the disclosure includes an optical communication apparatus comprising a processor configured to encode four modulated symbols, denoted as $S_1$, $S_2$, $S_3$, and $S_4$, to generate four encoded symbols, denoted as $S_X^1$, $S_Y^1$, $S_X^2$, and $S_Y^2$, in two orthogonal polarizations, denoted as a X polarization and a Y polarization, using formulas $S_X^1=S_1+Z_3$, $S_X^2=-S_2-Z_4$, $S_Y^1=S_2-Z_4$, $S_Y^2=S_1-Z_3$, wherein $Z_3$ and $Z_4$ are computed as $$\begin{bmatrix} Z_3 \\ Z_4 \end{bmatrix} = M \begin{bmatrix} S_3 \\ S_4 \end{bmatrix},$$

where M is about $$\frac{1}{\sqrt{7}} \begin{bmatrix} 1+i & -1+2i \\ 1+2i & 1-i \end{bmatrix},$$

and a transceiver coupled to the processor and configured to transmit $S_X^1$ and $S_Y^1$ in a first time slot, and transmit $S_X^2$ and $S_Y^2$ in a second time slot successive to the first time slot.

In yet another embodiment, the disclosure includes an optical communication apparatus comprising a processor configured to receive two sequences of digital signals in a plurality of time slots, wherein the two sequences correspond to two components of two orthogonal polarizations, wherein one digital signal per polarization is received in each of the plurality of time slots, divide each of the two sequences into a plurality of groups using a modulo operation of time, wherein each group comprises two digital signals received in two consecutive time slots, and adaptively equalize the four digital signals of the two consecutive time slots using a 4×4 matrix to generate four modulated symbols, wherein the 4×4 matrix comprises 16 tap-vectors.

In yet another embodiment, the disclosure includes a method comprising receiving two sequences of digital signals in a plurality of time slots, wherein the two sequences correspond to two components of two orthogonal polarizations, wherein one digital signal per polarization is received in each of the plurality of time slots, dividing each of the two sequences into a plurality of groups using a modulo operation of time, wherein each group comprises two digital signals received in two consecutive time slots, and adaptively equalizing the four digital signals of the two consecutive time slots using a 4×4 matrix to generate four modulated signals, wherein the 4×4 matrix comprises 16 tap-vectors.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

During propagation, an optical signal may experience different losses in its two polarization components due to PDL. In addition, optical noises may be added to the signal. Thus, when received by a receiver, the two polarization components of the signal may have different optical signal-to-noise ratios (OSNR). In a PDL-present optical system, performance of the system may vary with state of polarization (SOP) rotation angle. One modulation scheme of interest is polarization multiplexed (PM) quadrature phase shift keying (QPSK). PM QPSK signals have been considered in Institute of Electrical and Electronics Engineers (IEEE) and International Telecommunication Union (ITU) standards bodies to accommodate 100 Gbps optical channels.

Figure 1:
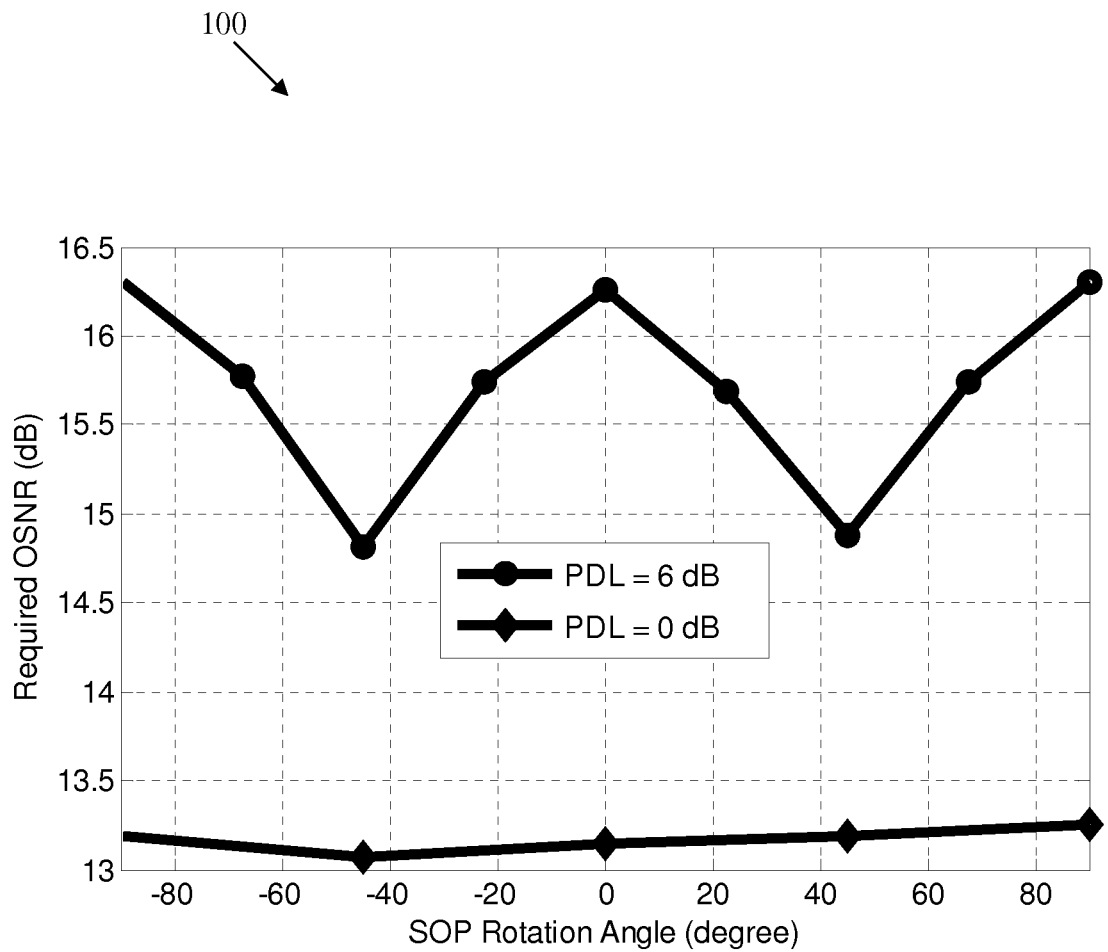
FIG. 1 shows required optical signal-to-noise ratios (OSNR) to achieve 0.3% bit error rate (BER) at different state of polarization (SOP) rotation angles ranging from −90° to +90°.

For example, FIG. 1 shows required optical signal-to-noise ratios (OSNR) to achieve 0.3% bit error rate (BER) for PM QPSK at different SOP rotation angles ranging from −90° to +90°. As shown in FIG. 1, two cases are compared: one with no PDL and the other with 6 dB PDL. In comparison with the no PDL case, the 6 dB PDL case may lead to a BER penalty of about 3.2 dB, since its overall performance may be worst when the SOP rotation angle is at −90°, zero or +90°. The dependence of the BER on the SOP rotation angle may be attributed to the fact that, at ±45° SOP rotation, the effect of PDL is averaged over two polarizations. However, at other SOP rotations such as zero or ±90°, the PDL may be weaker in one polarization (e.g., X polarization) and stronger in the other (e.g., Y polarization). In implementation, since a transmitter may not be aware of the SOP rotation angle, the system may need to be designed to satisfy the required OSNR at all SOP rotation angles. In other words, the overall system performance may be limited by the worst scenarios. Thus, it may be desirable to design a coding scheme in both polarization and time (i.e., referred to hereinafter as polarization-time coding) to get diversity gain in all paths, thereby averaging the effect of PDL in both polarizations regardless of SOP rotation angles.

In wireless communication systems, space-time coding has been proposed to achieve diversity gain in multiple-input and multiple-output (MIMO) channels. As a multiplexed polarization coherent optical channel may be considered as a type of 2×2 MIMO channel, the wireless schemes may be carried over and adopted for optical communication channels. To date, there have been several block space-time codes proposed for 2×2 MIMO channels. For example, a well-known code may be referred to as the Golden code, which is a linear dispersion space-time code. However, since optical channels have different impulse response and different behaviors from wireless channels, the Golden code may no longer be a good candidate. In an optical channel, codes with a higher minimum distance may lead to better performance. For example, a code referred to as the Silver code may outperform the Golden code in coherent optical channels, according to an article titled "Space-Time Codes for Optical Fiber Communication with Polarization Multiplexing," by S. Mumtaz, G. R. B. Othman, and Y. Jaouen in *Proceedings of the IEEE International Conference on Communications* (ICC'10), Cape Town, South Africa, May 23-27, 2010, pp. 1-5, which is hereby incorporated by reference. Nevertheless, in contrast with Golden code, the Silver code is not a linear space-time code, thus its coding may be more complicated to implement in fiber optic channels.

Moreover, in an optical transmitter, there may be no full-rate 2×2 orthogonal code in both space and time. Consequently, in an optical receiver, a maximum-likelihood (ML) sphere packing decoder may be required, which may need optical channel information (e.g., PDL, SOP rotation angle, etc.). Such information may be difficult to obtain, for example, in a high speed long-haul optical fiber channel. Instead of using the ML sphere packing decoder, an adaptive equalizer may be designed in the optical receiver to equalize (or filter) coded signals. Further, it may be desirable to design a joint equalizer that could equalize and separate the coded signals at the same time.

Disclosed herein are systems and methods for improved polarization-time coding and equalization of optical signals. In a transmitter of an optical communication system, data symbols may be encoded in both polarization and time to get diversity in all paths. The disclosed polarization-time code is inspired and modified based on the Silver code, thus it may be referred to as a semi-Silver code. The semi-Silver code may be used in polarization multiplexed (PM) coherent fiber optic channels. In a receiver of the optical communication system, modulated symbols may be adaptively equalized by a 4×4

MIMO finite impulse response (FIR) equalizer. In an embodiment, two sequences of digital signals fed into the receiver may correspond to two components of two orthogonal polarizations. One digital signal per polarization may be received in each pre-defined time slot. Each of the two sequences may be divided into a plurality of groups using a modulo operation of time, and each group comprises two digital signals received in two consecutive time slots. Thus, four digital signals of the two consecutive time slots may be adaptively equalized using the 4×4 MIMO FIR equalizer to generate four modulated symbols. The 4×4 MIMO FIR equalizer comprises 16 tap-vectors. Depending on whether another 2×2 MIMO FIR equalizer is used before the 4×4 MIMO FIR equalizer, each of the 16 tap-vectors may comprise one tap or multiple taps. Simulation results of single-carrier and multi-carrier optical channels demonstrate improved performance with implementation of the disclosed systems and methods.

Figure 2:
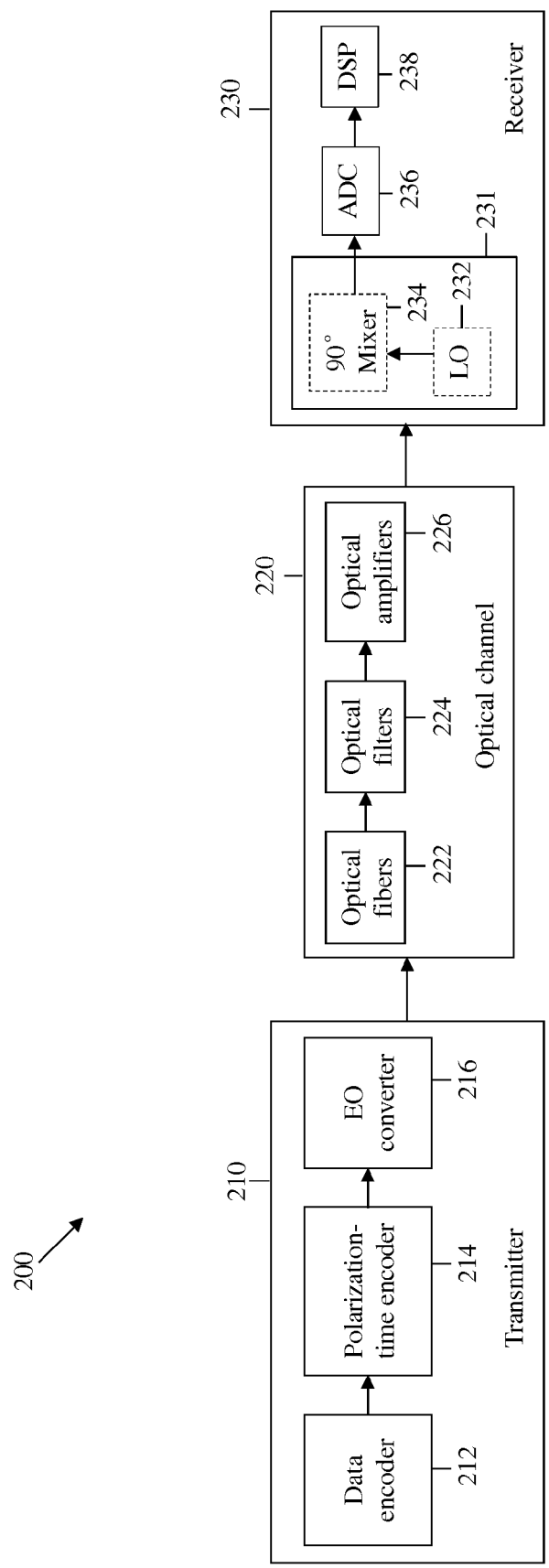
FIG. 2 is a diagram of an embodiment of an optical communication system.

An embodiment of an optical communication system 200 is shown in FIG. 2. The optical communication system 200 may be a single-carrier or multi-carrier system. The optical communication system 200 may comprise an optical transmitter 210, an optical channel 220, and an optical receiver 230 arranged as illustrated in FIG. 2. The optical transmitter 210 may comprise a data encoder 212, a polarization-time encoder 214, and an electrical-to-optical (EO) converter 216. In an embodiment, the data encoder 212 may comprise a forward error correction (FEC) encoder and an optical modulator, such as an 8, 16, 32, or 64 quadrature amplitude modulator (QAM) or a QPSK modulator. The polarization-time encoder 214 may further encode (or transform) the symbols modulated in the data encoder 212, in order to combat the effect of PDL in an optical fiber. A disclosed polarization-time code may be implemented in the polarization-time encoder 214. A detailed description of the polarization-time code will be provided later. The output of the polarization-time encoder 214 may be multiplexed. For example, four data streams may be formatted as two orthogonal liner polarization signals (X and Y polarizations), wherein each polarization component may comprise two orthogonal phase components (an in-phase I and a quadric-phase Q). The EO converter 216 may convert the polarization signals to optical signals that are suitable for transmission in an optical fiber.

The optical channel 220 may be configured to transport optical signals from the transmitter 210 to the receiver 230, and as such may comprise one or more optical fibers 222, optical filters 224 and amplifiers 226. The optical channel 220 may also comprise one or more wavelength-selective switches (WSSs). Such components of the optical channel 220 may introduce undesired signal changes, such as chromatic dispersion, nonlinear phase noise, polarization mode dispersion, polarization dependent loss and/or gain, polarization rotation, optical white Gaussian noise, or combinations thereof. For example, undesired signal changes may include amplitude and/or phase distortion due to cascaded WSSs.

The receiver 230 may receive optical signals in successive time slots. The receiver 230 may comprise an integrated coherent receiver 231, an analog-to-digital converter (ADC) 236 coupled to the integrated coherent receiver 231, and a digital signal processor (DSP) unit 238 coupled to the ADC 236. The integrated coherent receiver 231 may receive an optical signal input and generate one or more electrical signal outputs. The integrated coherent receiver 231 may comprise a laser serving as a local oscillator (LO) 232 and a 90° mixer 234 coupled to the LO 232. The 90° mixer 234 may comprise an about 90° optical cross network mixer and a photodetector (e.g. a p-type/intrinsic/n-type (PIN) diode), and may be configured to mix the received orthogonal components of the optical signal from the transmitter 210 and split the signal into a plurality of signals, where each signal may be a combination of the orthogonal signal components. The 90° mixer 234 may mix the received optical signal components with an optical signal from the LO 232 that may have a close or about the same carrier frequency of the transmitted optical signal. The output from the mixer 234 may split a received signal into four signals, with each signal being a mixture of transmitted data signals. The output mixed signals from the 90° mixer 234 may then be converted by the ADC 236 (e.g., from analog to digital) and forwarded to the DSP unit 238, which may be configured to process the signals and recover the data in the transmitted signal, as discussed further in detail later. A DSP unit may also be referred to simply as a DSP, and the DSP unit 238 may comprise an application specific integrated circuit (ASIC) DSP.

In the present disclosure, a polarization-time code may be implemented in the polarization encoder 214 of the transmitter 210 to encode four modulated symbols (i.e., signals), and a corresponding 4×4 MIMO FIR equalizer may be implemented in the DSP 238 to recover the modulated symbols.

An embodiment of a polarization-time code will now be described. In the polarization-time encoder 214, the modulated symbols may be coded in two dimensions: in linear orthogonal polarizations and in successive time slots. For example, four modulated symbols may be encoded to be four signals in two polarizations, which may then be transmitted in two consecutive time slots. Thus, the transmitter 210 comprising the polarization-time encoder 214 may operate at a full rate, and have spectral efficiency equivalent to that of transmitting one symbol per polarization per time slot. The polarization-time code may lead to averaging of channel effects including PDL on a plurality of modulated symbols. In use, a 2×2 polarization-time code may be expressed by a matrix:

$$\begin{bmatrix} f_1(S_1, S_2, S_3, S_4) & f_2(S_1, S_2, S_3, S_4) \\ f_3(S_1, S_2, S_3, S_4) & f_4(S_1, S_2, S_3, S_4) \end{bmatrix}$$

where $f_1(S_1, S_2, S_3, S_4)$, $f_2(S_1, S_2, S_3, S_4)$, $f_3(S_1, S_2, S_3, S_4)$, and $f_4(S_1, S_2, S_3, S_4)$ are four functions of four modulated symbols, denoted as $S_1$, $S_2$, $S_3$, and $S_4$.

Inspired by the Silver code in wireless communication, in an embodiment of a disclosed "semi-silver" code, the four modulated symbols may be encoded into four encoded symbols, denoted as $S_X^1$, $S_Y^1$, $S_X^2$, and $S_Y^2$, in two orthogonal polarizations, denoted as a X polarization and a Y polarization, using formulas:

$$S_X^1 = S_1 + Z_3$$

$$S_X^2 = -S_2 - Z_4$$

$$S_Y^1 = S_2 - Z_4$$

$$S_Y^2 = S_1 - Z_3$$

where $Z_3$ and $Z_4$ are intermediate symbols whose values are computed as:

$$\begin{bmatrix} Z_3 \\ Z_4 \end{bmatrix} = M \begin{bmatrix} S_3 \\ S_4 \end{bmatrix},$$

where M is about $$\frac{1}{\sqrt{7}}\begin{bmatrix} 1+i & -1+2i \\ 1+2i & 1-i \end{bmatrix},$$

In an embodiment, $$M = \frac{\alpha}{\sqrt{7}}\begin{bmatrix} 1+i & -1+2i \\ 1+2i & 1-i \end{bmatrix},$$

where α is a coefficient lying between 0.8 and 1.3. As shown later in results, a value of α that satisfies 0.8≤α≤1.3 yields good performance. In particular, when α=1, $Z_3$ and $Z_4$ are computed as:

$$\begin{bmatrix} Z_3 \\ Z_4 \end{bmatrix} = \frac{1}{\sqrt{7}}\begin{bmatrix} 1+i & -1+2i \\ 1+2i & 1-i \end{bmatrix}\begin{bmatrix} S_3 \\ S_4 \end{bmatrix}.$$

In digital systems, coefficients may not be represented by floating-point values and instead may be quantized or represented by integer or fixed-point values. Thus, floating-point values represented above (e.g., $1/\sqrt{7}$) may be represented as fixed-point values in implementation and still be within the scope of the invention.

Figure 3:
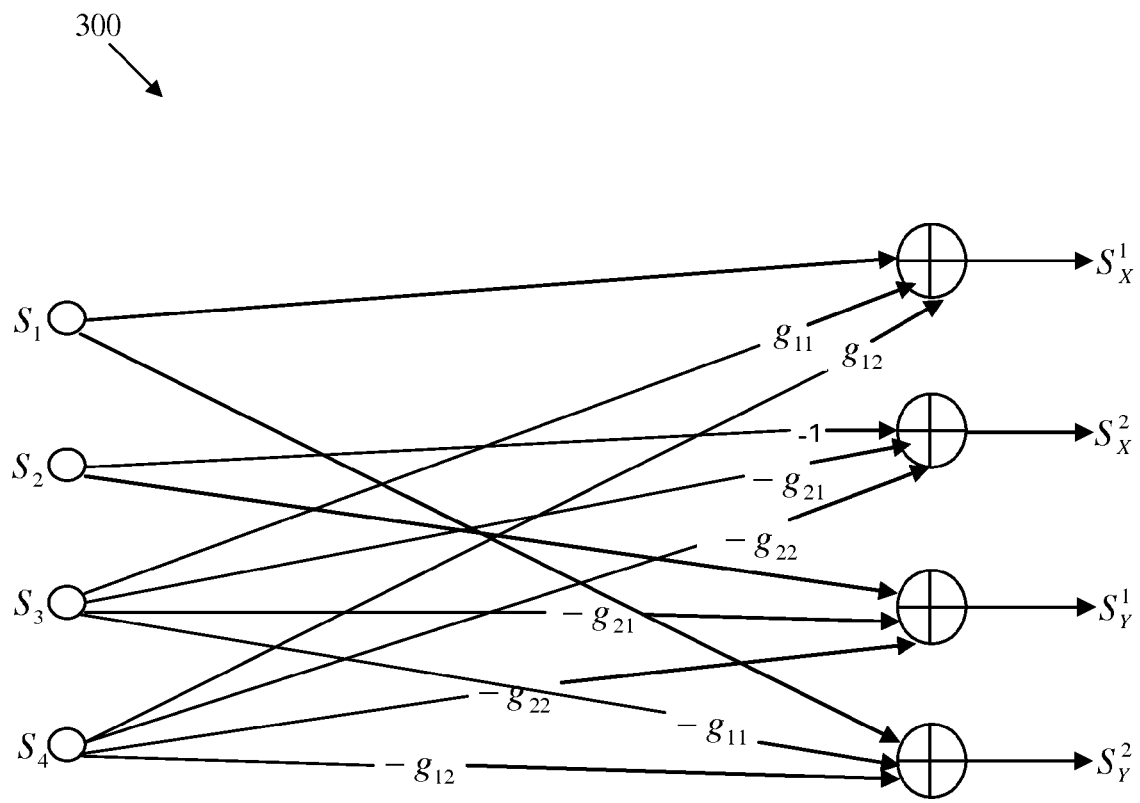
FIG. 3 is a diagram of an embodiment of a polarization-time coding process.

FIG. 3 illustrates an embodiment of a polarization-time coding process. In this case, the equations above (when α=1) may also be expressed by a matrix operation:

$$\begin{bmatrix} S_X^1 \\ S_Y^1 \\ S_X^2 \\ S_Y^2 \end{bmatrix} = N \cdot \begin{bmatrix} S_1 \\ S_2 \\ S_3 \\ S_4 \end{bmatrix}$$

where N is about:

$$\begin{bmatrix} 1 & 0 & g_{11} & g_{12} \\ 0 & 1 & -g_{21} & -g_{22} \\ 0 & -1 & -g_{21} & -g_{22} \\ 1 & 0 & -g_{11} & -g_{12} \end{bmatrix},$$

where 
$$\begin{cases} g_{11} = \frac{1+i}{\sqrt{7}} \\ g_{12} = \frac{-1+2i}{\sqrt{7}} \\ g_{21} = \frac{1+2i}{\sqrt{7}} \\ g_{22} = \frac{1-i}{\sqrt{7}}. \end{cases}$$

After implementation of the polarization-time code above, the encoded symbols may be transmitted in a sequence. For example, $S_X^1$ and $S_Y^1$ may be transmitted in a first time slot as the X and Y polarization components respectively, and $S_X^2$ and $S_Y^2$ may be transmitted in a second time slot as the X and Y polarization components respectively. The second time slot may be successive or consecutive to the first time slot, and may have an equal or similar duration. It should be noted herein that the coefficients (or elements of coefficients) used above, such as M, $g_{11}$, $g_{12}$, $g_{21}$, and $g_{22}$, may vary within a certain limit (e.g., ±10%). Any coefficient varied within the limit should be deemed as within the scope of the disclosed invention.

Figure 4:
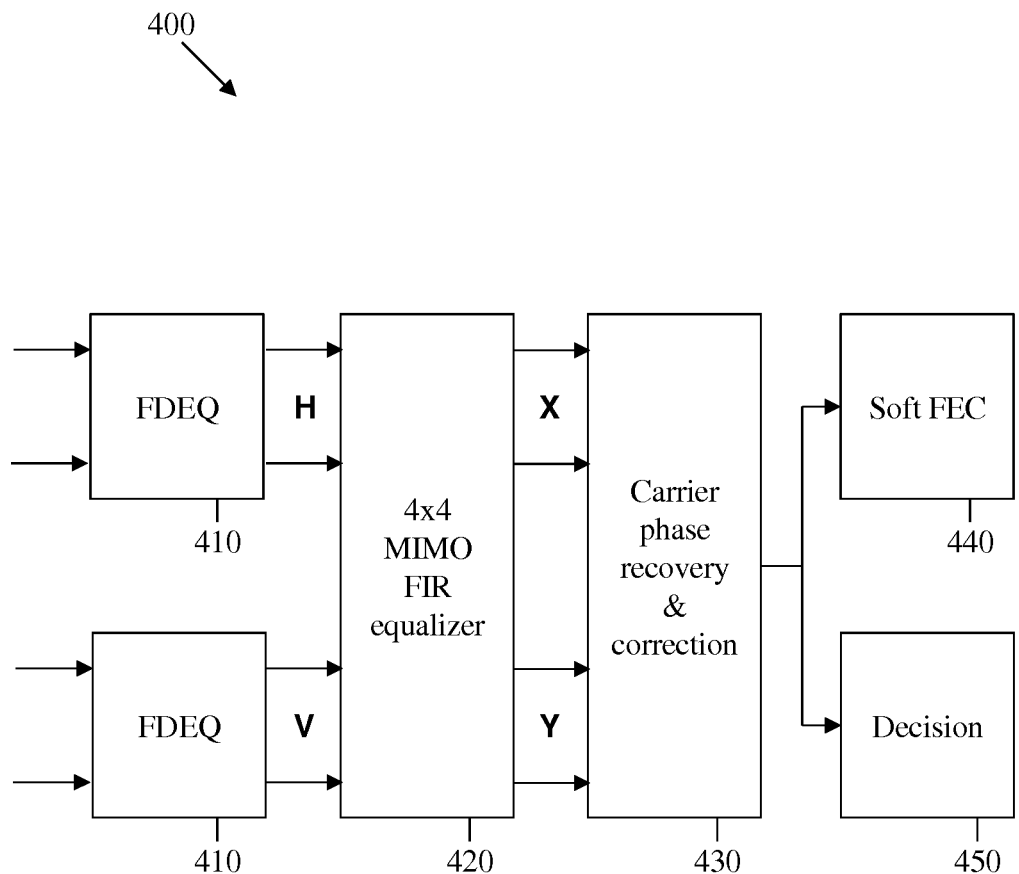
FIG. 4 is a schematic diagram of an embodiment of a receiver digital signal processor (DSP) unit.

In practice, when signals encoded by polarization-time coding are received by a receiver, they may need to be decoded and demodulated in a DSP unit before being used. FIG. 4 is a schematic diagram of an embodiment of a receiver DSP unit 400 for decoding and demodulating polarization multiplexed (PM) quadrature phase shift keying (QPSK) signals. For example, the DSP unit 400 may correspond to DSP unit 238 in FIG. 2. Signals (comprising samples) digitized by an ADC, such as the ADC 236 in FIG. 2, may be fed into the DSP unit 400 in successive time slots. In each time slot, the receiver DSP unit 400 may be configured to receive two complex-valued signals corresponding to two orthogonal polarization components. Each complex-valued polarization component may comprise two real-valued signals (i.e., an in-phase I and a quadric-phase Q), since each component may utilize QPSK signaling. Thus, the DSP unit 400 may receive four real-valued signals in each time slot. There may be two frequency-domain equalizers (FDEQs) 410, wherein each FDEQ may use a same transfer function to compensate for chromatic dispersion, a modem response, and amplitude distortion due to the presence of one or more WSSs between a transmitter and receiver.

The FDEQs 410 may perform filtering in the frequency domain. For two complex-valued input signals, assuming complete mitigation of PMD and filtering effects, each of the FDEQs 410 may generate two complex-valued output signals using conventional equations:

$$\begin{bmatrix} E_X^o \\ E_Y^o \end{bmatrix} = \begin{bmatrix} \lambda_X & 0 \\ 0 & \lambda_Y \end{bmatrix}\begin{bmatrix} \cos(\theta) & \sin(\theta)e^{j\varphi} \\ -\sin(\theta)e^{-j\varphi} & \cos(\theta) \end{bmatrix}\begin{bmatrix} E_X^i \\ E_Y^i \end{bmatrix} + \begin{bmatrix} Z_X \\ Z_Y \end{bmatrix},$$

where $E_X^o$ and $E_Y^o$ may refer to the X and Y polarization components of outputs of the FDEQs 410; $\lambda_X$ and $\lambda_Y$ may refer to PDLs in the X and Y polarizations, respectively; θ and φ are polarization rotation angles; $E_X^i$ and $E_Y^i$ may refer to the X and Y polarization components, respectively, of a digital output signal of an encoder in a transmitter (e.g., the polarization-time encoder 214 in FIG. 2); and $Z_X$ and $Z_Y$ may refer to the X and Y polarization components, respectively, of additive noise added to the transmitted signal during transmission, which may be, for example, a random noise with a Gaussian distribution.

After equalization in the frequency-domain, the output signals from the FDEQs 410 may go through further equalization in the time-domain. Various configurations of one or more MIMO FIR equalizers may be used for the time-domain equalization. For example, one 4×4 MIMO FIR equalizer 420 may be used to filter the output signals from the FDEQs 410, as shown in FIG. 4. The equalizer 420 may process signals in groups of two time slots. This setup may correspond to a polarization-time encoder, such as the polarization-time encoder 214, which encodes four modulated symbols (i.e., $S_1$, $S_2$, $S_3$, and $S_4$.) and transmit them in two consecutive time slots. Thus, after the equalizer 420, four complex-valued modulated symbols may be recovered for every group of two time slots. The four modulated symbols may be a noisy version of the original modulated symbols (i.e., $S_1$, $S_2$, $S_3$, and $S_4$.).

A carrier phase recovery and correction unit 430 may be configured to recover a carrier phase. The carrier phase recovery and correction unit 430 may correct the timing of the received component signals, which may be offset due to fiber dispersion. Outputs from the carrier phase recovery and correction unit 430 may be decoded in a decoder comprising a soft FEC unit 440 or a decision unit 450. The soft FEC unit 440 may receive soft values from the carrier phase recovery and correction unit 430, and use the soft values to generate data for each polarization (e.g., the X polarization and the Y polarization). The decision unit 450 may demodulate the data using, for example, 16 QAM demodulation. An output of the decision unit 450, which are constellation points symbols, may be passed into a hard FEC to generate data for each polarization.

Figure 5:
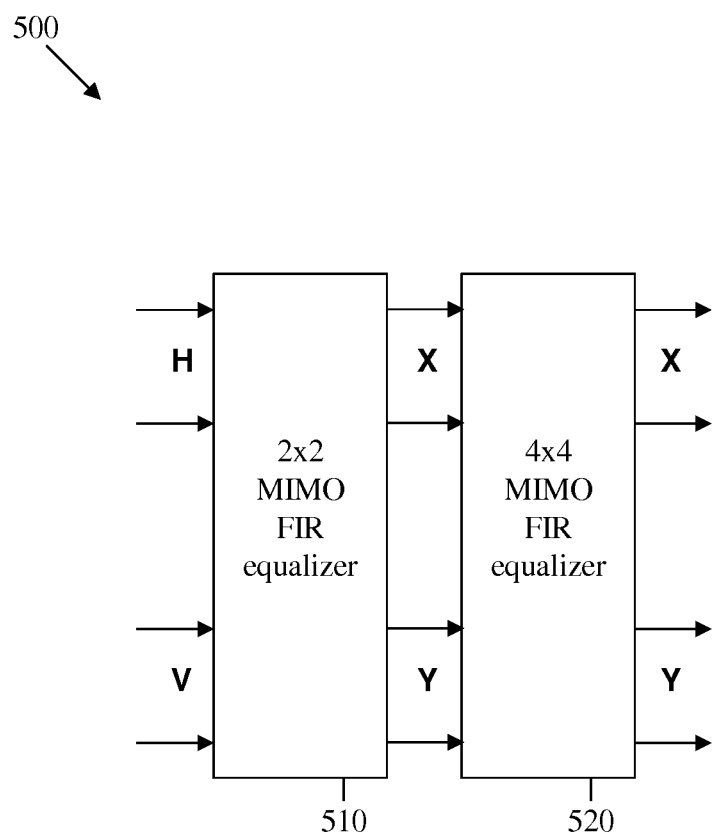
FIG. 5 is a schematic diagram of an embodiment of a multiple-input and multiple-output (MIMO) finite impulse response (FIR) equalization scheme.

While FIG. 4 shows one MIMO FIR equalizer, in another embodiment, two MIMO FIR equalizers may be used to realize filtering of signals in the time-domain. FIG. 5 is a schematic diagram of an embodiment of a MIMO FIR equalization scheme 500, which comprises a 2×2 MIMO FIR equalizer 510 and a 4×4 MIMO FIR equalizer 520. The 2×2 MIMO FIR equalizer 510 may be a conventional equalizer. For example, in one time slot, the 2×2 MIMO FIR equalizer 510 may receive two complex-valued inputs (i.e., two polarization components) and generate two complex-valued outputs using conventional equations:

$$\begin{bmatrix} E_X^e \\ E_Y^e \end{bmatrix} = \begin{bmatrix} E_X^i \\ E_Y^i \end{bmatrix} + \begin{bmatrix} W_{XX} & W_{YX} \\ W_{XY} & W_{YY} \end{bmatrix} \begin{bmatrix} Z_X \\ Z_Y \end{bmatrix} = \begin{bmatrix} E_X^i \\ E_Y^i \end{bmatrix} + \begin{bmatrix} \overline{Z}_X \\ \overline{Z}_Y \end{bmatrix},$$

where $E_X^e$ and $E_Y^e$ may refer to the X and Y polarization components of an output of the equalizer 510, $E_X^i$ and $E_Y^i$ may refer to the X and Y polarization components of a digital output signal of an encoder in a transmitter (e.g., the polarization-time encoder 214 in FIG. 2), $W_{XX}$, $W_{YX}$, $W_{XY}$ and $W_{YY}$ are time coefficients or tap-vectors, each of which may comprise a plurality of taps, $Z_X$ and $Z_Y$ may refer to the X and Y polarization components of an additive noise added to the transmitted signal during transmission, which may be, for example, a random noise with a Gaussian distribution, and $\check{Z}_X$ and $\check{Z}_Y$ may refer to the X and Y polarization components of an equalized equivalent noise.

The 4×4 MIMO FIR equalizer 520 may further filter output signals (e.g., $E_X^e$ and $E_Y^e$) from the 2×2 MIMO FIR equalizer 510. The 4×4 MIMO FIR equalizer 520 may filter signals in groups of two time slots. Thus, four modulated symbols may be recovered for every group of two time slots. The four modulated symbols may be a noisy version of the original modulated symbols (i.e., $S_1$, $S_2$, $S_3$, and $S_4$.) encoded in a polarization-time encoder (e.g., the polarization-time encoder 214). Due to the presence of the preceding equalizer 510, the equalizer 520 may be similar to the equalizer 420 in FIG. 4, but made relatively simpler. An equalization scheme applicable to both the equalizer 520 in FIG. 5 and the equalizer 420 in FIG. 4 is described below, with a discussion of implementation differences thereafter.

In optical communication, the X and Y polarization components of an optical signal may be transported separately in an optical channel. In a receiver, an ADC may digitize the X and Y polarization components of the optical signal and generate two sequences of digital signals or symbols in the X and Y polarizations. Each sequence may comprise a plurality of signals, denoted as $r_X(t)$ and $r_Y(t)$, received at different times (denoted as t). The equalizer 420 (or the equalizer 520) may filter the plurality of signals in groups of two. Thus, for every two signals (received in a period of two time slots), each of $r_X(t)$ and $r_Y(t)$ may be divided into two signals based on its received time. For example, $r_X(t)$ may be divided into two signals, denoted as $r_X^1$ and $r_X^2$, and $r_Y(t)$ may be divided into two signals, denoted as $r_Y^1$ and $r_Y^2$, using a modulo division. In a T by 2 system, the modulo division may be mathematically expressed by four equations:

$$r_X^1 = \{r_X(t) | (t \bmod 4) \in \{0,1\}\}$$

$$r_X^2 = \{r_X(t) | (t \bmod 4) \in \{2,3\}\}$$

$$r_Y^1 = \{r_Y(t) | (t \bmod 4) \in \{0,1\}\}$$

$$r_Y^2 = \{r_Y(t) | (t \bmod 4) \in \{2,3\}\}$$

Figure 6:
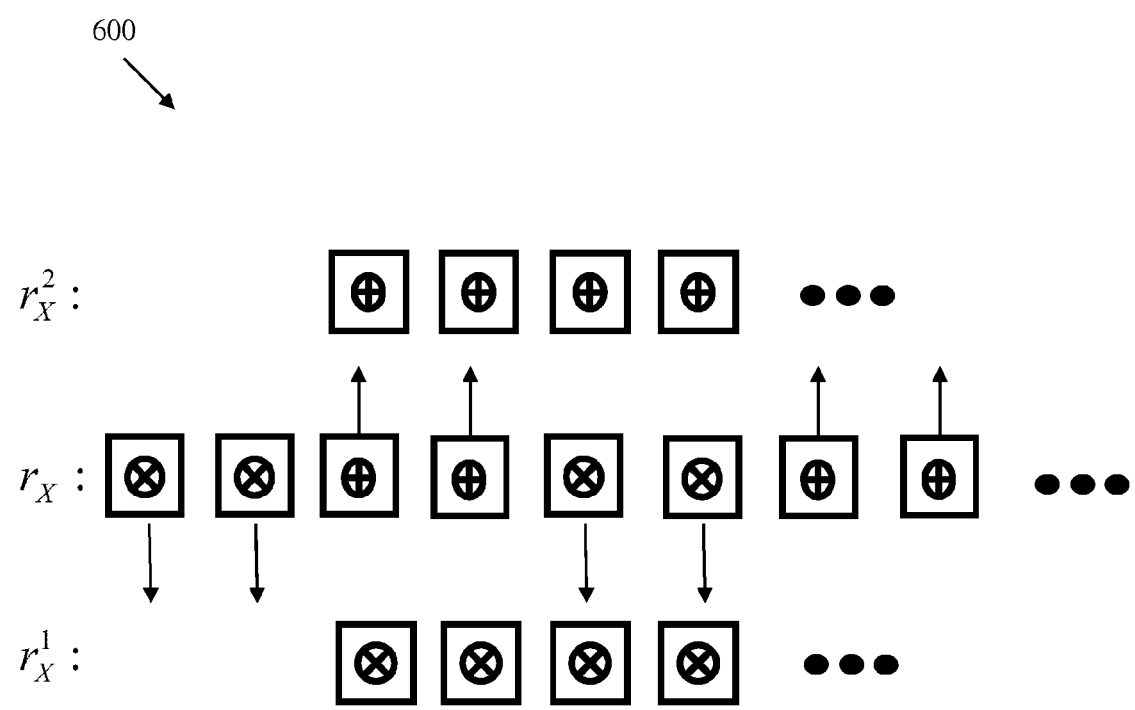
FIG. 6 is a diagram of an embodiment of a modulo division scheme.

FIG. 6 shows an embodiment of a modulo division scheme 600 for $r_X(t)$. According to the modulo division scheme 600, $r_X(t)$ may be regarded as $r_X^1$ if the remainder of t divided by 4 is zero or one. Otherwise, $r_X(t)$ may be regarded as $r_X^2$ if the remainder of t divided by 4 is two or three. While FIG. 6 shows a T by 2 (two-fold oversampling) system, where every two consecutive samples of the sequence $r_X(t)$ are grouped, a similar modulo division may be adopted by a T by K system, where K is an integer referring to an oversampling rate (e.g., K=1 for Nyquist rate sampling or K=2 for two-fold oversampling) For example, every K consecutive samples of the sequence $r_X(t)$ may be grouped, and divided into 2 signals. In an embodiment, the following equations may be used to divide $r_X(t)$ and $r_Y(t)$ in the T by K system:

$$r_X^1 = \{r_X(t) | (t \bmod 2K) \in \{0, \ldots, K-1\}\}$$

$$r_X^2 = \{r_X(t) | (t \bmod 2K) \in \{K, \ldots, 2K-1\}\}$$

$$r_Y^1 = \{r_Y(t) | (t \bmod 2K) \in \{0, \ldots, K-1\}\}$$

$$r_Y^2 = \{r_Y(t) | (t \bmod 2K) \in \{K, \ldots, 2K-1\}\}$$

After the modulo division, in a period of two time slots, it may be regarded that $r_X^1$ and $r_Y^1$ are received in a first time slot, and $r_X^2$ and $r_Y^2$ are received in a second time slot.

Figure 7:
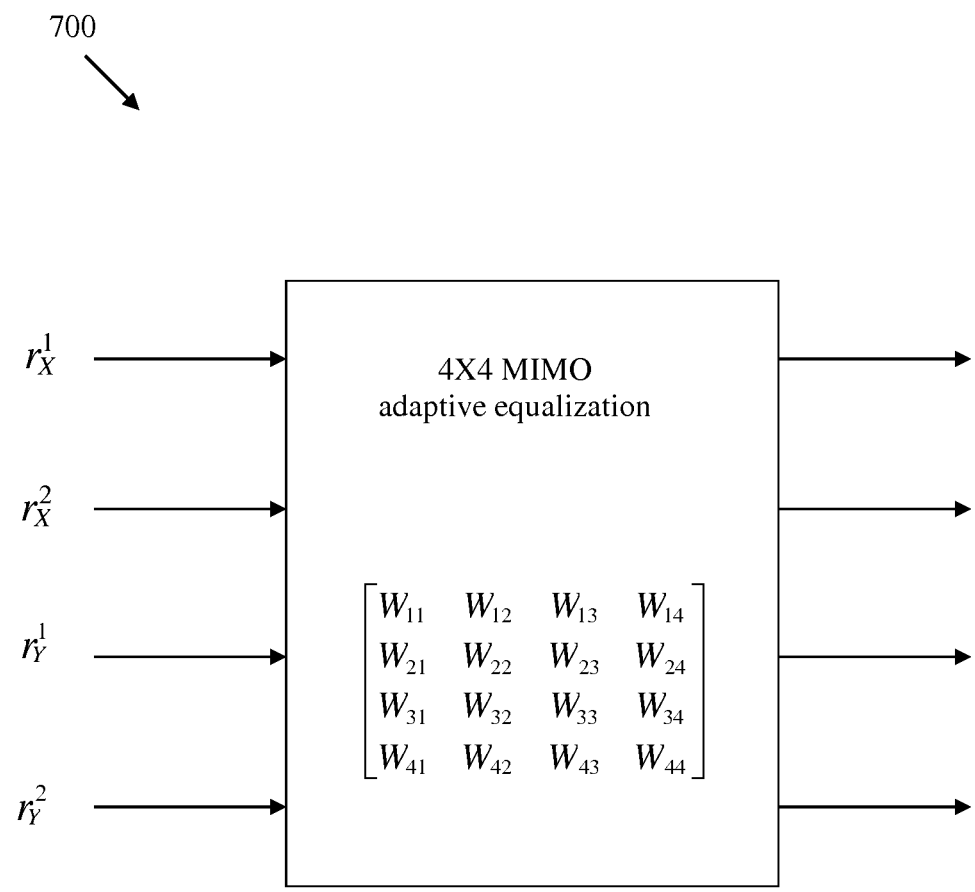
FIG. 7 is a diagram of an embodiment of a 4×4 MIMO adaptive equalization scheme.

After the four signals $r_X^1$, $r_X^2$, $r_Y^1$, $r_Y^2$ are generated, a 4×4 MIMO adaptive equalization scheme 700 may be used to filter the four signals, as illustrated in FIG. 7. The 4×4 MIMO adaptive equalization scheme 700 may use an equalization matrix below to transform its inputs to outputs:

$$\begin{bmatrix} W_{11} & W_{12} & W_{13} & W_{14} \\ W_{21} & W_{22} & W_{23} & W_{24} \\ W_{31} & W_{32} & W_{33} & W_{34} \\ W_{41} & W_{42} & W_{43} & W_{44} \end{bmatrix}$$

The equalization matrix above comprise 16 time coefficients which are tap-vectors. Each tap-vector may be adaptively updated symbol-by-symbol based on an error signal computed by comparing an equalized signal with a decision signal. Consider one tap-vector $W_{11}$ as an example. An existing value of $W_{11}$, denoted as $W_{11}^{old}$, may be adaptively updated to a new value of $W_{11}$, denoted as $W_{11}^{new}$, following the equation:

$$W_{11}^{new} = W_{11}^{old} + \mu \cdot E$$

where $\mu$ is a correcting coefficient, and E is an difference between an equalized signal and a decision signal. In use, $\mu$ may be configured to have a relatively small value (e.g., $10^{-3}$). The decision signal may be generated by a decision unit, such as a QAM slicer. The decision unit may be located in an equalizer, such as the equalizer 420 in FIG. 4 or the equalizer

520 in FIG. 5, which employs a minimum mean square error (MMSE) algorithm. As a result of adaptive equalization, the output of the 4×4 MIMO adaptive equalization scheme 700 may be a noisy version of QPSK constellation points, corrupted by an additive Gaussian noise. In a group of two time slots, the four outputs of the 4×4 MIMO adaptive equalization scheme 700 may be noise corrupted versions of four modulated symbols (i.e., $S_1$, $S_2$, $S_3$, and $S_4$.) that were encoded by a polarization-time encoder (e.g., polarization-time encoder 214 in FIG. 2). Thus, the 4×4 MIMO adaptive equalization scheme 700 may jointly equalize and separate coded symbols at the same time.

The 4×4 MIMO adaptive equalization scheme 700 may be used to implement either the equalizer 420 in FIG. 4 or the equalizer 520 in FIG. 5. In comparison, each tap-vector of the equalizer 420 may comprise a plurality of taps, while each tap-vector of the equalizer 520 may comprise only one tap as dispersion and DGD are already compensated in a FDEQ (e.g., the FDEQ 410) and a 2×2 TDEQ (e.g., the equalizer 510). Thus, although the MIMO FIR equalization scheme 500 may need two equalizers instead of one, its ability to use single-tap-vectors may reduce computational complexity.

Figure 8:
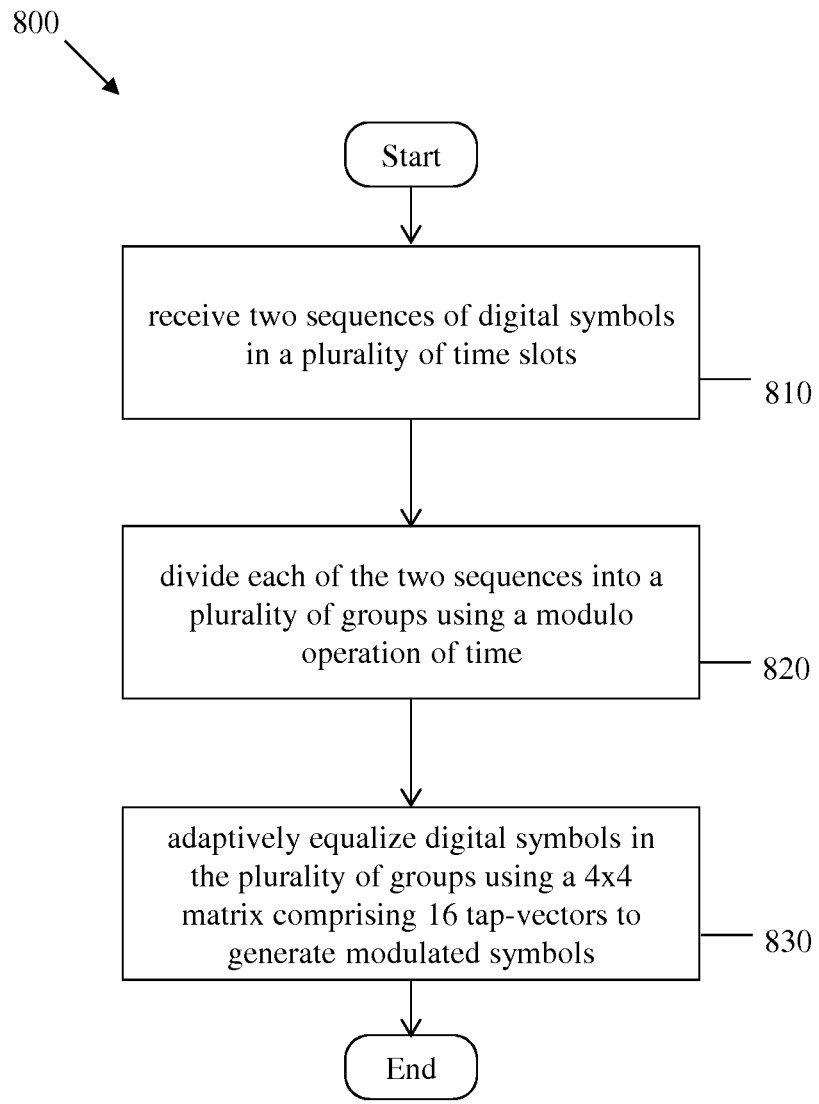
FIG. 8 is a flowchart of an embodiment of a MIMO FIR equalization method.

FIG. 8 is a flowchart of an embodiment of a MIMO FIR equalization method 800, which may be implemented in a receiver (e.g., the receiver 230 in FIG. 2) of an optical communication system. The method 800 may start in step 810, where two sequences of digital samples may be received in a plurality of time slots. The two sequences may correspond to two components of two orthogonal polarizations, wherein one digital symbol per polarization is received in each of the plurality of time slots. Next in step 820, each of the two sequences may be divided into a plurality of groups using a modulo operation of time, wherein each group comprises two digital samples received in two consecutive time slots. Next, in step 830, the four digital samples of the two consecutive time slots may be adaptively equalized using a 4×4 matrix to generate four modulated symbols, wherein the 4×4 matrix comprises 16 tap-vectors.

Figure 9:
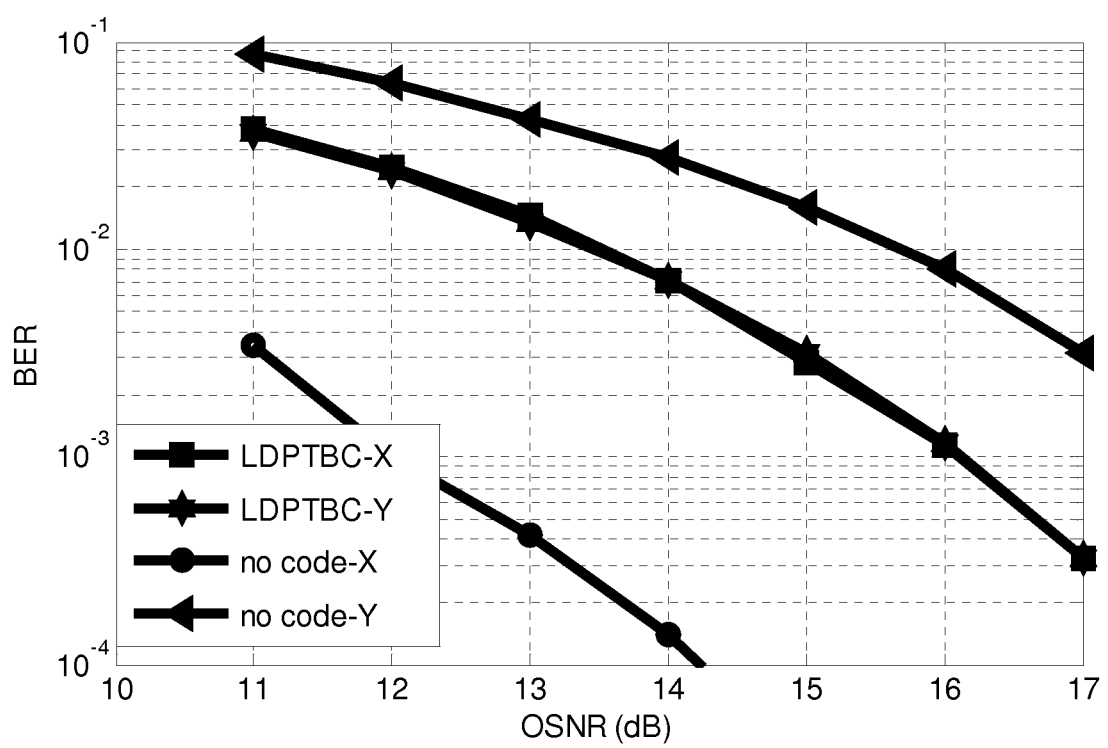
FIG. 9 shows three waterfall curves (i.e., BER versus OSNR) of a system with and without LDPTBC codes.
Figure 10:
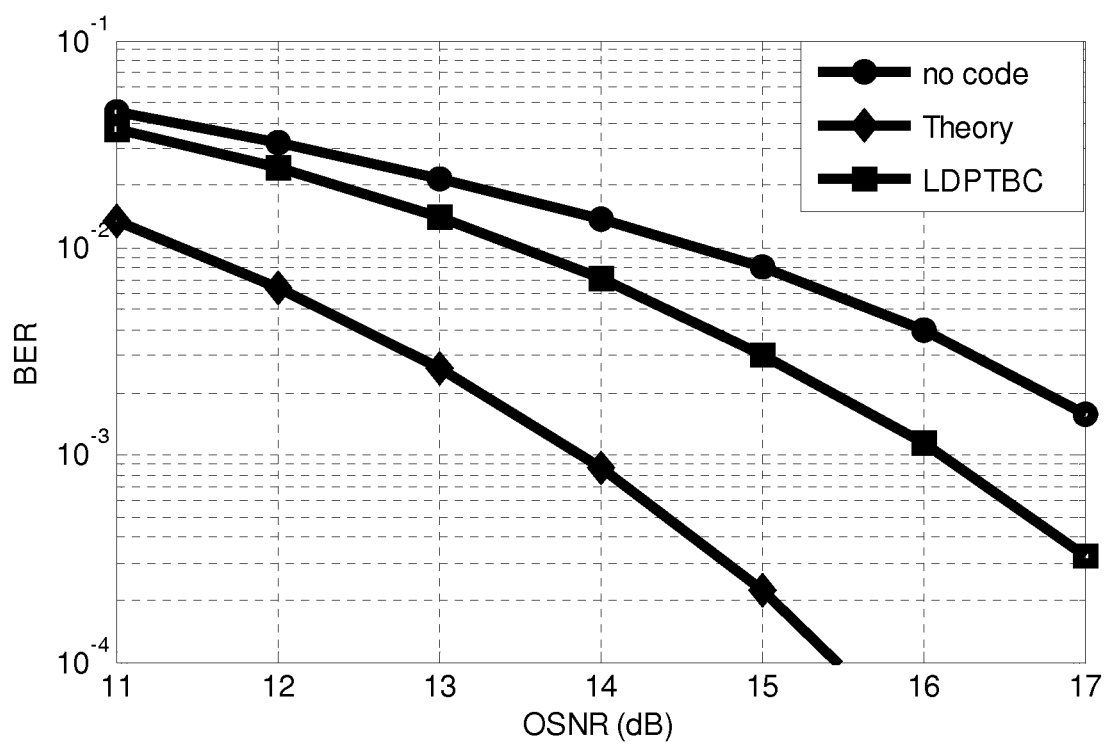
FIG. 10 shows three waterfall curves (i.e., BER versus OSNR) of the same system with results averaged in the X and Y polarizations.

The performance of the disclosed polarization-time coding and/or equalization schemes have been tested and compared with conventional schemes under various conditions. FIGS. 9 and 10 show simulation results of a single-carrier optical channel, which is modeled to be a T by 2 zero order hold (ZOH) QPSK system with 6 dB PDL, laser phase noise with 0.2 Meg line width, and colored phase noise with 0.1 radian standard deviation (the ZOH models a digital-to-analog converter on the transmitter side). FIG. 9 shows three waterfall curves (i.e., BER versus OSNR) of the system with and without linear dispersion polarization-time block (LDPTBC). SOP rotation angles are set to have θ=0 and φ=0, and BERs of the X polarization and Y polarization are plotted separately. It may be seen that, with LDPTBC coding, the BER versus OSNR curve is essentially the same in the X and Y polarizations. Without LDPTBC coding, the BER versus OSNR curve is better in the X polarization than the Y polarization, showing polarization dependence in system performance. FIG. 10 shows BER versus OSNR curves of the same system, but with results averaged in the X and Y polarizations. In comparison with the conventional system without LDPTBC, a BER improvement of about 1 dB is demonstrated with LDPTBC coding. A theoretic best value is also demonstrated, which has yet to be realized in practice.

Figure 11:
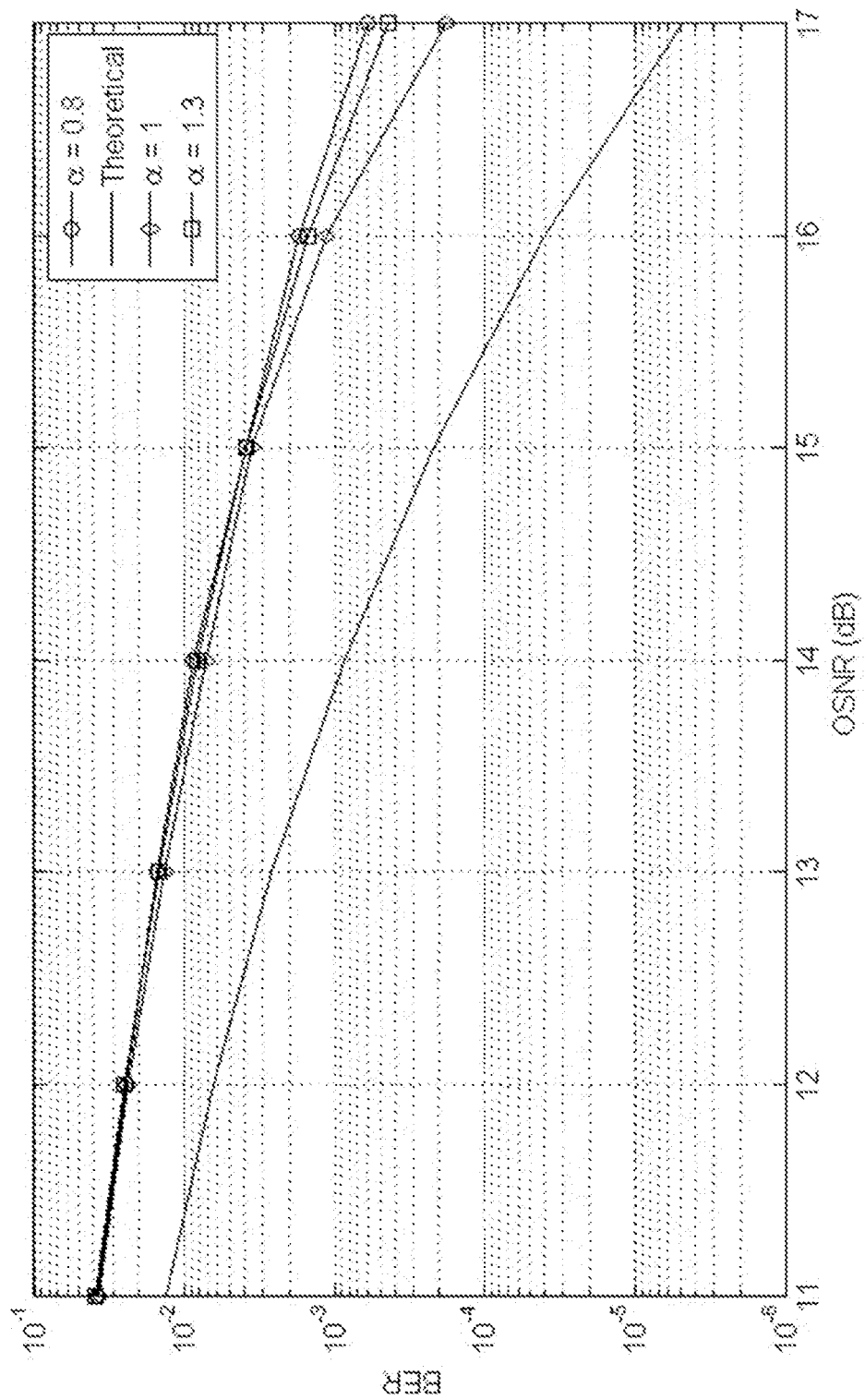
FIG. 11 shows four waterfall curves (i.e., BER versus OSNR) of the same system with three different values of coefficient α.

FIG. 11 shows BER versus OSNR of the same system with different values of the coefficient α as described above in the semi-silver code. Simulation results of three α values (α=0.8, α=1, and α=1.3) are shown. It can be seen that when α is between 0.8 and 1.3, the semi-silver code may function efficiently, and a BER of the system is reduced compared to a conventional coding case (see FIG. 10). Of the three α values, α=1 yields the best result, because at a same level of OSNR, α=1 leads to a least BER, which is closest to a theoretic minimal value.

Figure 12:
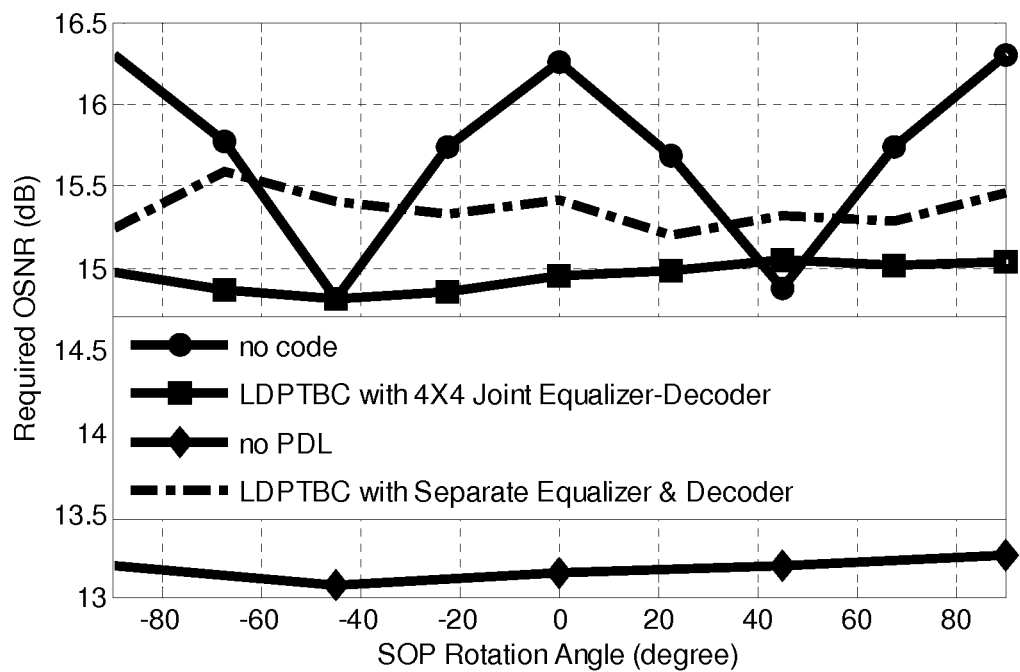
FIG. 12 shows required OSNR (rOSNR) versus SOP rotation angle in a single-carrier optical channel.

FIG. 12 shows simulation results of a single-carrier optical channel, which is modeled to be a T by 2 ZOH QPSK system, which has laser phase noise with 0.2 Meg line width, and colored phase noise with 0.1 radian standard deviation. FIG. 12 shows the required OSNR to reach a BER of 0.3% at different SOP rotation angles θ, which varies from −90° to +90°. Also, two PDL cases are compared: one without PDL and the other with 6 dB PDL. As illustrated in FIG. 12, without PDL, the required OSNR is the smallest of all cases (around 13.3 dB). In a conventional system with 6 dB PDL, the system performance is limited by the worst case scenario when θ is at 0 or ±90° (required OSNR around 16.3 dB). In two disclosed systems with LDPTBC, the performance is relatively steady with θ and provides a gain of more than 1 dB in the presence of 6 dB PDL. Further, a 4×4 joint equalizer-decoder is also compared with a separate equalizer and decoder. Since the 4×4 joint equalizer-decoder may equalize and separate coded signals simultaneously, it may more efficiently correct signal corruptions caused by PDL, thus it shows better performance.

Figure 13:
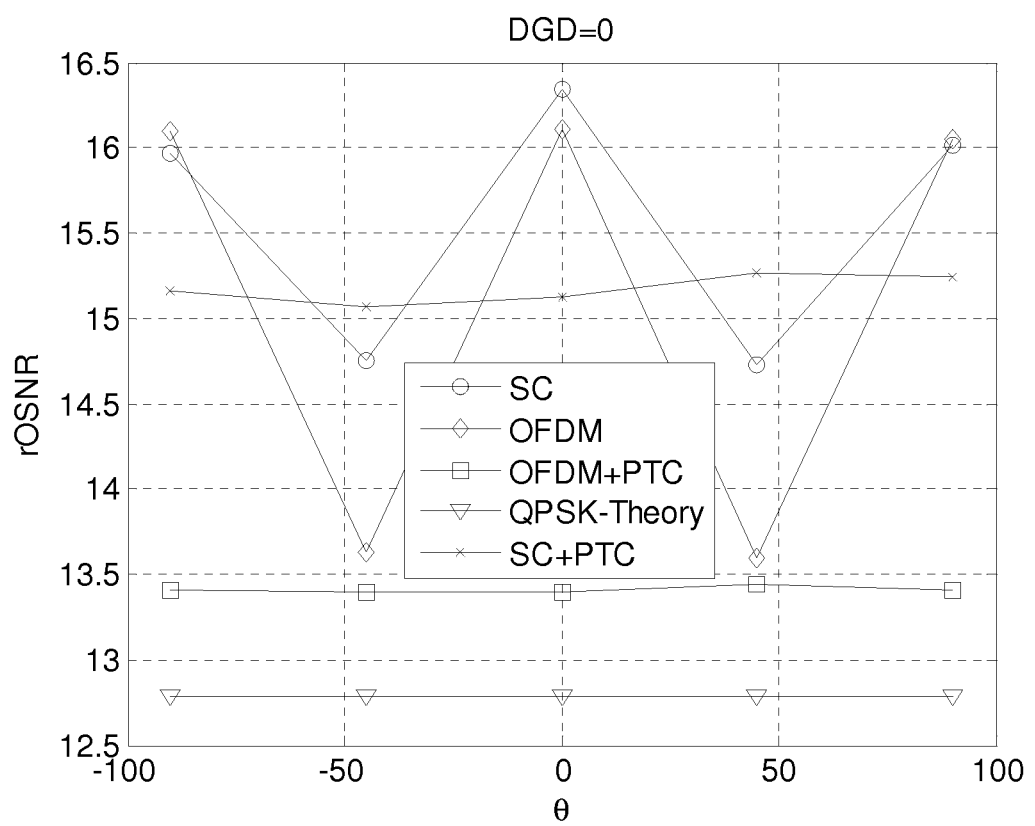
FIG. 13 shows rOSNR versus SOP rotation angle in five different cases.
Figure 14:
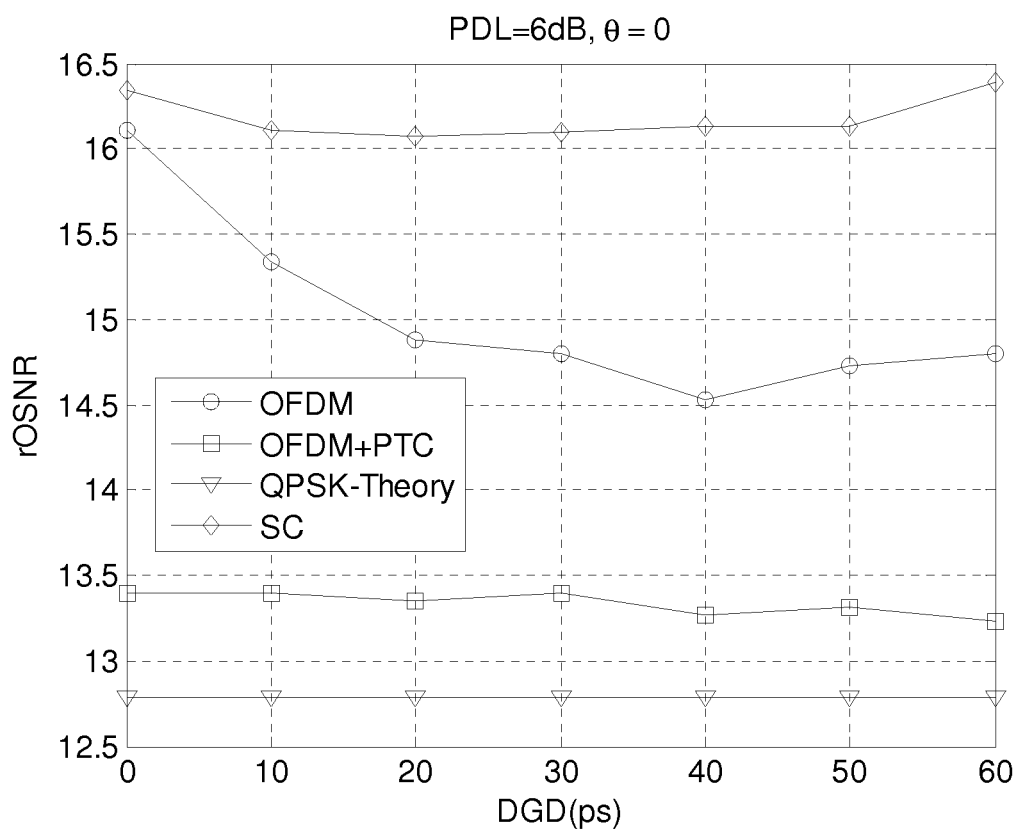
FIG. 14 shows rOSNR versus differential group delay (DGD) in the presence of 6 dB PDL when SOP rotation angle equals zero.

FIGS. 13 and 14 show simulations results obtained from both a single-carrier system and a multi-carrier system. The multi-carrier system used in simulation comprises 256 sub-carriers, and is based on orthogonal frequency-division multiplexing (OFDM). Also, maximum likelihood (ML) decoding is used in simulation instead of equalizing. FIG. 13 shows the required OSNR (rOSNR) versus the SOP rotation angle (θ) in five different cases, all of which have 6 dB PDL and no differential group delay (DGD). As shown in FIG. 13, without polarization-time coding (denoted as PTC), both a single-carrier (denoted as SC) system and an OFDM system show significant dependence on θ. With implementation of a disclosed polarization-time code in a 32 Gbaud QPSK system, the SC system has around 15.2 dB rOSNR, while the OFDM system has around 13.4 dB rOSNR, which is 1.8 dB lower. Based on this result, it may be seen that the performance of polarization-time coding is even higher in an OFDM system than in a SC system. A theoretic case with QPSK has around 12.8 dB rOSNR, which suggests that the OSNR penalty in an OFDM system is around 0.6 dB due to the 6 dB PDL. FIG. 14 shows rOSNR versus DGD in the presence of 6 dB PDL when θ=0. Without PTC, a SC system has around 16.1-16.4 dB rOSNR depending on DGD, and an OFDM system has around 14.5-16.4 dB rOSNR, which varies significantly with DGD. With PTC, the dependence of OFDM system on DGD is largely eliminated, with rOSNR varying around 13.2-13.4 dB. A theoretic case with QPSK shows around 12.8 dB rOSNR, which suggests that the OSNR penalty in an OFDM system remains around 0.6 dB due to the 6 dB PDL.

Figure 15:
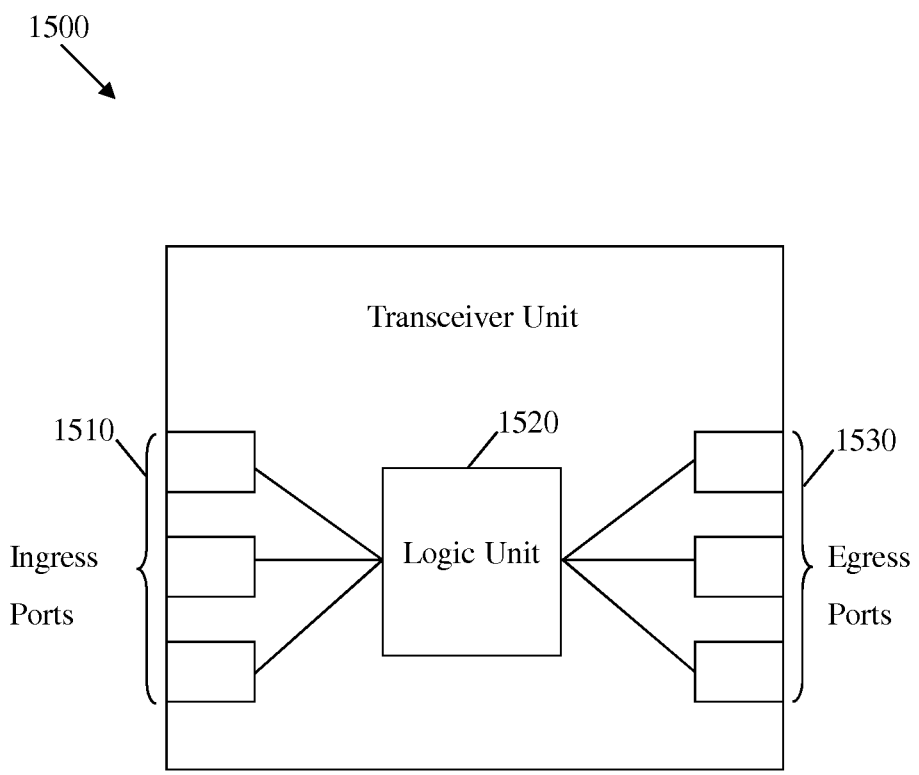
FIG. 15 is a schematic diagram of an embodiment of a transceiver unit.

FIG. 15 is a schematic diagram of an embodiment of a transmitter or receiver (transceiver) unit 1500, which may be any device that transports signals through a network. For instance, the transceiver unit 1500 may be located in the optical communication system 200, i.e., may implement all or part of the transmitter 210 or the receiver 230. The transceiver unit 1500 also may be configured to implement or support any of the schemes described herein, such as the polarization-time coding process 300, the receiver digital signal processor (DSP) unit 400, the MIMO FIR equalization scheme 500, the 4×4 MIMO adaptive equalization scheme 700, and the MIMO FIR equalization method 800. The transceiver unit 1500 may comprise one or more ingress ports or units 1510 for receiving packets, objects, or type-length-values (TLVs) from other network components, a logic unit 1520 to determine which network components to send the packets to, and one or more egress ports or units 1530 for transmitting frames to the other network components. The logic circuitry 1520 may also comprise all or part of DSP unit 400 described above and may be configured to implement at least some of the steps of the method 800 described above.

Figure 16:
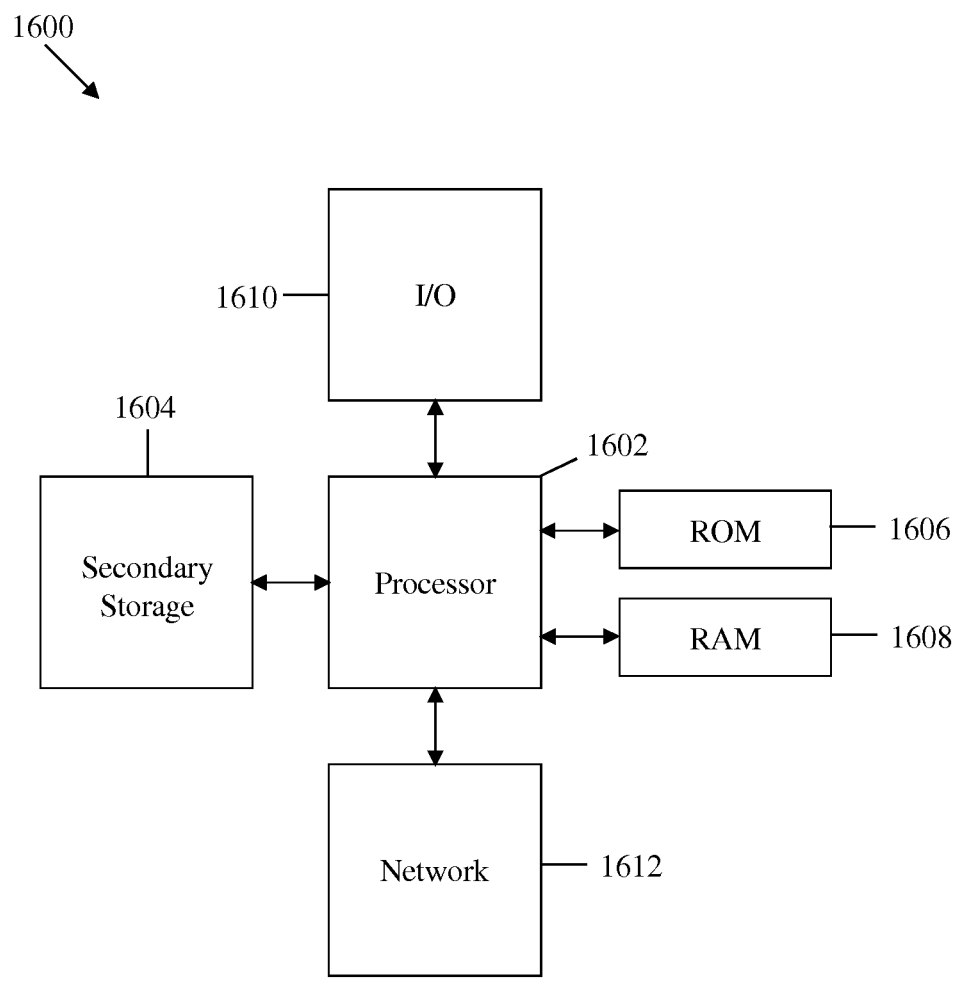
FIG. 16 is a schematic diagram of a typical, general-purpose network component or computer system.

The schemes described above may be implemented on any general-purpose network component, such as a computer or network component with sufficient processing power, memory resources, and network throughput capability to handle the necessary workload placed upon it. FIG. 16 illustrates a schematic diagram of a typical, general-purpose network component or computer system 1600 suitable for implementing one or more embodiments of the methods disclosed herein, such as the polarization-time coding process 300, the receiver digital signal processor (DSP) unit 400, the MIMO FIR equalization scheme 500, the 4×4 MIMO adaptive equalization scheme 700, and the MIMO FIR equalization method 800. The general-purpose network component or computer system 1600 includes a processor 1602 (which may be referred to as a central processor unit or CPU) that is in communication with memory devices including secondary storage 1604, read only memory (ROM) 1606, random access memory (RAM) 1608, input/output (I/O) devices 1610, and network connectivity devices 1612. Although illustrated as a single processor, the processor 1602 is not so limited and may comprise multiple processors. The processor 1602 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1602 may be configured to implement any of the schemes described herein, such as the polarization-time coding process 300, the receiver digital signal processor (DSP) unit 400, the MIMO FIR equalization scheme 500, the 4×4 MIMO adaptive equalization scheme 700, and the MIMO FIR equalization method 800, which may be implemented using hardware, software, or both.

The secondary storage 1604 is typically comprised of one or more disk drives or tape drives and is used for non-volatile storage of data and as an over-flow data storage device if the RAM 1608 is not large enough to hold all working data. The secondary storage 1604 may be used to store programs that are loaded into the RAM 1608 when such programs are selected for execution. The ROM 1606 is used to store instructions and perhaps data that are read during program execution. The ROM 1606 is a non-volatile memory device that typically has a small memory capacity relative to the larger memory capacity of the secondary storage 1604. The RAM 1608 is used to store volatile data and perhaps to store instructions. Access to both the ROM 1606 and the RAM 1608 is typically faster than to the secondary storage 1604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of optical communication comprising:
    encoding four modulated symbols, denoted as $S_1$, $S_2$, $S_3$, and $S_4$, to generate four encoded symbols, denoted as $S_X^1$, $S_Y^1$, $S_X^2$, and $S_Y^2$, in two orthogonal polarizations, denoted as a X polarization and a Y polarization, using formulas:

$S_X^1 = S_1 + Z_3$ $S_X^2 = -S_2 - Z_4$ $S_Y^1 = S_2 - Z_4$ $S_Y^2 = S_1 - Z_3$, wherein $Z_3$ and $Z_4$ are computed as:

$$\begin{bmatrix} Z_3 \\ Z_4 \end{bmatrix} = M \begin{bmatrix} S_3 \\ S_4 \end{bmatrix},$$

where M is about $$\frac{1}{\sqrt{7}} \begin{bmatrix} 1+i & -1+2i \\ 1+2i & 1-i \end{bmatrix};$$

transmitting $S_X^1$ and $S_Y^1$ in a first time slot; and
transmitting $S_X^2$ and $S_Y^2$ in a second time slot successive to the first time slot.

2. The method of claim 1, wherein the method is implemented in a multi-carrier optical communication system.

3. The method of claim 1, wherein the method is implemented in a single-carrier optical communication system.

4. An optical communication apparatus comprising:
a processor configured to encode four modulated symbols, denoted as $S_1$, $S_2$, $S_3$, and $S_4$, to generate four encoded symbols, denoted as $S_X^1$, $S_Y^1$, $S_X^2$, and $S_Y^2$, in two orthogonal polarizations, denoted as a X polarization and a Y polarization, using formulas:

$S_X^1 = S_1 + Z_3$ $S_X^2 = -S_2 - Z_4$ $S_Y^1 = S_2 - Z_4$ $S_Y^2 = S_1 - Z_3$, wherein $Z_3$ and $Z_4$ are computed as:

$$\begin{bmatrix} Z_3 \\ Z_4 \end{bmatrix} = M \begin{bmatrix} S_3 \\ S_4 \end{bmatrix},$$

where M is about $$\frac{1}{\sqrt{7}} \begin{bmatrix} 1+i & -1+2i \\ 1+2i & 1-i \end{bmatrix};$$

and
a transceiver coupled to the processor and configured to:
transmit $S_X^1$ and $S_Y^1$ in a first time slot; and
transmit $S_X^2$ and $S_Y^2$ in a second time slot successive to the first time slot.

5. The apparatus of claim 4, wherein the transceiver is configured to transmit a multi-carrier optical signal.

6. The apparatus of claim 4, wherein the transceiver is configured to transmit a single-carrier optical signal.

* * * * *